United States Patent [19]

Cassidy et al.

[11] Patent Number: 5,114,480
[45] Date of Patent: May 19, 1992

[54] INTERNAL MOULD RELEASE COMPOSITIONS

[75] Inventors: Edward F. Cassidy, Brussels, Belgium; Herbert R. Gillis, Sterling Heights, Mich.; Malcolm Hannaby, Leuven; Alain Parfondry, Evere, both of Belgium

[73] Assignee: Imperial Chemical Industries plc, London, England

[21] Appl. No.: 731,964

[22] Filed: Jul. 18, 1991

Related U.S. Application Data

[60] Division of Ser. No. 331,402, Mar. 30, 1989, Pat. No. 5,055,134, which is a continuation-in-part of Ser. No. 287,940, Dec. 21, 1988, Pat. No. 4,983,659, which is a continuation-in-part of Ser. No. 160,647, Feb. 26, 1988, Pat. No. 4,794,129, which is a continuation-in-part of Ser. No. 105,641, Oct. 6, 1987, abandoned.

[30] Foreign Application Priority Data

Mar. 31, 1988 [GB] United Kingdom ............... 8807684

[51] Int. Cl.⁵ ...................... B29C 33/56; B29C 33/60
[52] U.S. Cl. .............................. 106/38.24; 106/38.22
[58] Field of Search .................... 106/38.24; 524/701, 524/731, 711

[56] References Cited

U.S. PATENT DOCUMENTS

| | | | |
|---|---|---|---|
| 3,888,690 | 6/1975 | Geiser | 106/38.24 |
| 3,983,071 | 9/1976 | Jurisch | 260/42 |
| 4,183,875 | 1/1980 | Eckelt et al. | 525/6 |
| 4,519,965 | 5/1985 | Taylor et al. | 264/51 |
| 4,581,386 | 4/1986 | Taylor et al. | 521/125 |
| 4,585,803 | 4/1986 | Nelson et al. | 521/105 |
| 4,667,009 | 5/1987 | Ewen et al. | 528/68 |
| 4,753,966 | 6/1988 | Haas et al. | 521/51 |
| 4,764,537 | 8/1988 | Horn et.al. | 521/51 |
| 4,764,540 | 8/1988 | Dewhurst et al. | 521/110 |
| 4,789,688 | 12/1988 | Dewhurst et al. | 521/110 |
| 4,794,129 | 12/1988 | Gillis, Jr. et al. | 521/121 |
| 4,847,307 | 7/1989 | Dewhurst et al. | 521/110 |
| 4,866,103 | 9/1989 | Cassidy et al. | 521/159 |
| 4,876,019 | 10/1989 | Meyer et al. | 252/32.5 |
| 4,886,838 | 12/1989 | Dewhurst | 521/117 |
| 4,897,428 | 1/1990 | Dewhurst et al. | 521/115 |
| 4,910,279 | 3/1990 | Gillis et al. | 528/49 |
| 5,002,999 | 3/1991 | Lowery et al. | 106/38.22 |
| 5,019,600 | 5/1991 | Dewhurst | 521/117 |

Primary Examiner—William R. Dixon, Jr.
Assistant Examiner—Margaret V. Einsmann

[57] ABSTRACT

An internal mould release composition, suitable for use in the production of moulded articles by the RIM process, comprising:
 a) a metal salt of an organic acid, said metal salt having mould release properties, and
 b) a compatibilising amount of an amidine or imidate compound.

6 Claims, No Drawings

INTERNAL MOULD RELEASE COMPOSITIONS

This is a divisional of Ser. No. 07/331,402, filed Mar. 30, 1989, now U.S. Pat. No. 5,055,134, which is a continuation-in-part of Ser. No. 07/287,940, filed Dec. 21, 1988, now U.S. Pat. No. 4,983,659, which is a continuation-in-part of Ser. No. 07/160,647, filed Feb. 26, 1988, now U.S. Pat. No. 4,794,129, which is a continuation-in-part of Ser. No. 07/105,641, filed Oct. 6, 1987, now abandoned.

This invention relates to internal mould release compositions and to their use in the production of moulded articles by the reaction injection moulding process from reaction mixtures containing organic polyisocyanates and isocyanate-reactive components.

The production of moulded articles, for example automotive body parts, from organic polyisocyanates and isocyanate-reactive components by the reaction injection moulding (RIM) process is well established. In the process, two highly reactive liquid streams, one containing a polyisocyanate and the other containing isocyanate-reactive components, for example polyol and/or polyamine reactants, are impingement mixed and rapidly injected into a mould cavity. By this method, high production rates of moulded polyurethane, polyurea and related polymeric articles having excellent physical properties can be achieved.

Whilst the RIM process is eminently suited to the mass production of isocyanate-based moulded articles, it is essential to its successful and economic operation that the moulded product can be easily removed from the mould without being damaged. One method of facilitating demoulding is to coat the internal surfaces of the mould with a mould release agent, for example a wax or soap. This procedure has the disadvantage that application of the release agent has to be repeated almost every time the mould is used, adding substantially to the time and cost of the process.

In order to overcome the problems associated with external mould release agent, it has been proposed to use release agents of the internal type pre-blended with either the polyisocyanate or the isocyanate-reactive component. One type of internal release agent which has been successfully used in the production of other moulded plastics articles comprises metal carboxylates such as zinc stearate.

Unfortunately, such salts are soluble in neither the polyisocyanate nor with most of the usual isocyanate-reactive components. It has been proposed, therefore, to use the metal salts in conjunction with certain materials which have the effect of compatibilising the salts with the isocyanate-reactive compounds. Thus, for example, it has been proposed in European Patent Publications 119471, 173888 and 190317 to employ various amino compounds as compatibilisers.

It has now been found that a superior compatibilizing effect can be obtained for metal salts of organic acids used in conjunction with isocyanate-reactive compounds, in the manufacture of polyurethane, polyurea and like polymers by processes such as the RIM process, when there is used as compatibilizing material a compound or mixture of compounds selected among amidine and imino-esters (also referred to as "imidates") of cyclic or acyclic form.

Accordingly, the invention provides an internal mold release composition comprising:

a) a metal salt of an organic acid, said metal salt having mould release properties and
b) a compatibilizing amount of a compound or mixture of compounds selected among amidine and imidate ester compounds of (1):

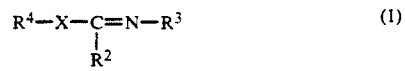

$$R^4-X-\underset{R^2}{C}=N-R^3 \qquad (1)$$

wherein X represents O, S, or NR$^1$ and wherein each of R$^1$ and R$^4$ independently or together represent, H or an organic radical.

It is noted that in the above formula at least two of the three substituents attached to the imino-units can be joined together to form at least one non-aromatic ring, preferably a 5 or 6 membered ring.

Suitable organic radicals include:
a) alkyl radicals, preferably of 1 to 10 C atoms, more preferably 1 to 6 C atoms;
b) cycloalkyl radicals, preferably of 5 to 7 C atoms;
c) aralkyl and aryl radicals of 6 to 18 C atoms—preferably substituted with electron donating substituents such as hydroxy, alkoxy, N,N-dialkyl-amino etc., such as benzyl, phenyl and phenylethyl;
d) polymeric chains containing hetero atoms (such as O, N or S) which may be selected from polyether chain, polyester chains, polyacetals, polycarbonates, etc.

Optionally, each of R$^1$ to R$^4$, when not H, may be further substituted with an additional amidine or imidate residue, a residue being a group obtained by the removal of any one of R$^1$ to R$^4$ radicals from above formula (1) compound.

Preferred amidine and imidate compounds for use in the compositions of the invention contain from 1 to 4 such group(s).

It is preferred that the amidine and imidate compounds have molecular weights not greater than 1500, perferably in the range 60 to 600, for example 100 to 600.

The term "compatibiliser", as used herein, refers to the formation of a stable dispersion, colloidal suspension and/or solution of the metal salt (having internal mould release properties) in the isocyanate reactive (resin) component of the reaction injection moulding (RIM) system.

The compatibilising agents of the invention have the advantage of improved stability (to precipitation of the metallic salt internal mold release agent) and better control over reactivity (i.e. flow, gel time).

The expression "a compatibilising amount" used herein means an amount of the amidine and imidate ester compound which is sufficient to provide a substantially stable solution or dispersion of mould release composition in an isocyanate-reactive compound or compounds. Clearly, this amount will vary depending on the nature of the metal salt, the nature of the isocyanate-reactive compound and their relative proportions as well as on the specific structure of the amidine and imidate compounds. Generally, the ratio (by weight) of compatibililser to metal carboxylate salt mold release agent can vary from about 90:10 to about 10:90, to provide compatibilizing in the isocyanate-reactive component.

The metal salts present in the compositions of the invention may be any metal salts which are derived from organic acids and which have mould release properties. Such salts have been fully described in the prior art relating to the moulding of polyurethanes, polyureas and other resins.

The organic acids from which the salts may be derived particularly include carboxylic acids containing from 8 to 24 carbon atoms. Such acids may be aromatic or cycloaliphatic but are preferably aliphatic monocarboxylic acids which may be straight-chain or branched, saturated or unsaturated and may carry substituents such as hydroxy, amino or amido groups. The most preferred aliphatic monocarboxylic acids are the so-called "fatty acids" having from 10 to 24 carbon atoms, for example lauric, palmitic, stearic, isosteric, oleic, linoleic and ricinoleic acids and mixtures of any of these.

The metal salts may be salts of any metal of Groups Ia, Ib, IIa and IIb of the Periodic Table or of other metals such as chromium, molybdenum, iron, cobalt, nickel, aluminium, tin, lead, antimony or bismuth. The preferred metals are lithium, magnesium, calcium, barium, iron, cobalt, nickel, copper, zinc, cadmium and aluminium and mixtures thereof.

As examples of particularly suitable salts there may be mentioned zinc stearate, zinc oleate, zinc palmitate, zinc laurate, zinc octoate, zinc behenate, zinc ricinoleate and the calcium, magnesium, nickel and copper salts of lauric, palmitic, stearic and oleic acids. The most preferred salt is zinc stearate.

The amidine and imidate ester compounds used as compatibilisers in the compositions of the invention are preferably capable of reacting with isocyanates, without the liberation of monomeric by-products.

The preparation of these amidine and imidate compounds in both cyclic and acyclic forms is well known in the literature.

A general review of the preparation of imidates is given in "The Chemistry of amidines and imidates", Ed. S. Patai, chapter 9, "Imidates including cyclic imidates", D. G. Neilson, John Wiley, London 1975. This work includes references to the preparation of the analogous thiomidates.

The preparation of acyclic imidates by the combination of an aliphatic or aromatic nitrile with an alcohol under acidic or basic conditions is described in F. C. Schaefer, G. A. Peters, J. Org. Chem., 26, 412, (1961).

The preparation of cyclic imidates, such as oxazolines and dihydro-1,3-oxazines, by the Ritter reaction (addition of 1,3-diols or epoxides to a nitrile under acid catalysis) is described in "Advances in heterocyclic chemistry", Vol. 6, Ed. A. R. Katritzky, A. R. Boulton, Section II.A, "Heterocyclic synthesis involving nitrilium salts and nitriles under acidic conditions", F. Johnson, R. Madronero, Academic Press, New York, 1966 and references therein. In addition this text teaches the preparation of thioimidates such as thiazolines and dihydro-1,3-thiazines. Methods for the preparation of oxazolines are also described in U.S. Pat. No. 3,630,996 to D. Tomalia, U.S. Pat. No. 3,640,957 to D. Tomalis and R. J. Thomas, in H. Witte, W. Seeliger, Angew. Chem. Int. Ed., 1972, 287 and in U.S. Pat. No. 3,813,378 to H. Witte and W. Seeliger.

A general review of the preparation of amidines is given in "The Chemistry of amidines and imidates", Ed. S. Patai, chapter 7, "Preparation and synthetic uses of amidines".

The general class of five membered ring amidines known as imidazolines can be prepared in a manner similar to that outlined above by the combination of a nitrile containing compound with ethylenediamine in the presence of an acid catalyst. Alternatively these materials can be prepared by the combination of ethylenediamine with carboxylic acids under dehydrating conditions. Other methods for the preparation of these materials include the combination of ethylenediamine with thioamides or with an imino ether hydrochloride. These procedures are described in "The Chemistry of Heterocyclic compounds: Imidazole and its Derivatives", Part I, Ed. A. Weissberger, author K. Hofman, Interscience Publishers, New York, 1953 and references therein. Particularly useful for the preparation of imidazoline terminated softblocks from cyanoethylated polyether polyols would be the method outlined in U.S. Pat. No. 4,006,247 to H. P. Panzer.

The preparation of the homologous 6 membered ring amidines—i.e. the tetrahydropyrimidines—can be achieved in a similar manner by the use of optionally substituted 1,3-propanediamine as the diamine component. Specific methods are described in "The Chemistry of Heterocyclic Compounds: The Pyrimidines, Supplement I", Ed. A. Weissberger and E. C. Taylor, author D. J. Brown, Interscience Publishers, New York, 1953.

Examples of especially suitable oxazolines and dihydro-1,3-oxazines for use in the composition of the invention include reaction products of carboxylic acids such as ethanoic acid, propanoic acid, butanoic acid, pentanoic acid, hexanoic acid, heptanoic acid, octanic acid, decanoic acid, undecanoic acid, oleic acid, stearic acid, palmitic acid, malonic acid, 4-chlorobenzoic acid, 4-nitrobenzoic acid, 3-nitrobenzoic acid with ethanolamine, 2-aminopropan-1-ol, 2-aminobutan-1-ol, 1-aminopropan-2-ol, 1-aminobutan-2-ol, 3-aminopropan-1-ol, 3-aminobutan-1-ol, 4-aminobutan-2-ol.

Examples of especially suitable imidazolines and tetrahydropyrimidines for use in the composition of the invention include reaction products of above outlined carboxylic acids with ethylene diamine, 1-2-propylenediamine, 1-2-butylenediamine, N-methylethylenediamine, N-ethyl-ethylenediamine, N-isopropylethylenediamine, 1-3-propylenediamine, 1-3-butanediamine, N-methyl-1,2-propylenediamine, N-methyl-1,3-propylene diamine, N-ethyl-1,3-propylene diamine.

Typical amidine and imidate compounds of cyclic form are: bis-oxazolines, bis-thiazolines, or bis-imidazolines derived from adiponitrile or adipic acid, etc. of following formula (2)

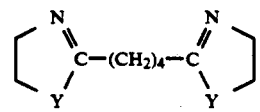

where
Y is O, S, NH, N—R, or N—Ar;
R is a monovalent aliphatic organic group of 1 to 10 carbons and Ar is an aromatic organic group of 6 to 18 carbons.

Mixtures of amidine and imidate compounds may be present in the composition, if desired.

The compositions of the invention typically contain from about 0.1 to about 40% preferably from about 1 to about 20% of metal salt on a weight basis.

The compositions may be conveniently prepared by agitating one or more metal salts, as hereinbefore defined, with one or more amidine or imidate compounds at ambient or elevated temperatures until a solution or stable dispersion is obtained. In some cases, stirring for several hours at temperatures of up to 80° C. or even higher may be necessary. Introduction of minor amounts of free fatty acid, such as oleic acid, is sometimes useful for improving compatibility still further.

As indicated above, the internal mould release compositions of the invention are useful in the production of moulded articles such as automobile parts including body panels by a process comprising reacting in a suitable mould a polyisocyante composition with a isocyanate-reactive composition comprising one or more compounds containing a plurality of isocyanate-reactive groups in the presence of said mould release composition.

In order to facilitate the incorporation of the internal mould release composition of the invention into the reaction mixture used in the moulding process, it is usually desirable to pre-blend said composition into at least part of the isocyanate-reactive composition employed in the process.

Accordingly, in another aspect of the invention, there is provided an isocyanate-reactive composition comprising at least one compound having a plurality of isocyanate-reactive groups having dissolved or dispersed therein an effective amount of an internal mould release composition comprising:
(a) a metal salt of an organic acid, said metal salt having mould release properties, and
(b) a compatibilising amount of a amidine or imidate compound of formula 1 or 2, the metal salt being incompatible with the compound having a plurality of isocyanate-reactive groups in the absence of the compatibiliser, under the conditions used for preparing and processing said isocyanate reactive composition.

Said isocyanate-reactive composition may be prepared by combining all the ingredients in a single operation (stirring and heating as necessary to provide complete compatibilisation) or, if desired, by pre-blending any two or more of the individual ingredients. It is often desirable to form such pre-blends or concentrates.

The expression "an effective amount" used herein means an amount of the mould release composition of the invention sufficient to provide improved mould release when the isocyanate-reactive composition is used in a moulding process. Where the isocyanate-reactive composition contains more than one isocyanate-reactive compound, the requirement of incompatibility with the metal salt means that the metal salt is incompatible with at least one of the isocyanate-reactive compounds present in the composition, under the conditions used for preparing and processing said composition.

Compounds containing a plurality of isocyanate-reactive groups which may be present in the isocyanate-reactive compositions of the invention include compounds having molecular weights of from about 60 to about 12000, containing an average of two or more isocyanate-reactive groups per molecule. Examples of isocyanate-reactive groups which may be present in these compounds include hydroxyl, thiol, primary amino, secondary amino, imino-functional and enamine groups, and mixtures of such groups. It is noted that the molecular weight for all high molecular weight compounds cited herein can be determined by gel permeation chromatography.

Particularly important isocyanate-reactive compositions for use in RIM processes contain a combination of a relatively high molecular weight polymer containing a plurality of isocyanate-reactive groups (usually referred to as a "softblock") and a relatively low molecular weight compound containing a plurality of isocyanate-reactive groups, usually known as a chain extender.

Thus, in a further aspect of the invention, there is provided an isocyanate-reactive composition comprising:
(i) at least one polymer containing a plurality of isocyanate-reactive groups and having a number average molecular weight of from 1500 to about 12000;
(ii) at least one chain extender having a molecular weight less than 1500, and
(iii) an effective amount of an internal mould release composition comprising:
(a) a metal salt of an organic acid, said metal salt having mould release properties, and
(b) a compatibilising amount of a amidine or imidate compound of formula 1 or 2, the metal salt being incompatible with the combination of (i) and (ii) in the absence of the compatibiliser, under the conditions used for preparing and/or processing said isocyanate reactive composition.

Polymers containing a plurality of isocyanate-reactive groups which may be present in the isocyanate-reactive compositions of the invention include polyols, polyamines, imino-functional polymers, enamine containing polymers and mixtures thereof.

Polymeric polyols having molecular weights in the range from 1500 to about 12000 are well known as polyurethane components and may be prepared by methods fully described in the prior art. As examples of suitable polyols there may be mentioned polythioethers, polyesters, polyesteramides, polycarbonates, polyacetals, polyolefins, polysiloxanes and, especially, polyethers.

Polyether polyols which may be used include products obtained by the polymerisation of a cyclic oxide, for example ethylene oxide, propylene oxide or tetrahydrofuran in the presence, where necessary, of polyfunctional initiators. Suitable initiator compounds contain a plurality of active hydrogen atoms and include water, polyols, for example ethylene glycol, propylene glycol, diethylene glycol, resorcinol, bisphenol A, glycerol, trimethylolpropane, 1,2,6-hexanetriol, triethanolamine, pentaerythritol, sorbitol or sucrose, ammonia, primary monoamines, for example aniline or benzylamine, polyamines, for example ethylene diamine, hexamethylene diamine, toluene diamines, diaminodiphenylmethanes and polymethylene polyphenylene polyamines obtained by the condensation of aniline and formaldehyde, and aminoalcohols, for example ethanolamine and diethanolamine. Mixtures of initiators and/or cyclic oxides may be used.

Especially useful polyether polyols include polyoxypropylene and poly(oxyethylene-oxypropylene) diols and triols obtained by the simultaneous or sequential addition of ethylene and propylene oxides to appropriate di- or trifunctional initiators as fully described in the prior art. Mixtures of the said diols and triols are often particularly useful.

Because of their enhanced reactivity, ethylene oxide tipped polyols are often preferred.

Polyester polyols which may be used include hydroxyl terminated reaction products of polyhydric alcohols such as ethylene glycol, propylene glycol, diethylene glycol, 1,4-butanediol, polyether polyols, bis(hydroxyethyl) terephthalate, glycerol, trimethylolpropane or pentaerythritol or mixtures thereof with polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate. Polyesters obtained by the polymerisation of lactones, for example caprolactone, in conjunction with a polyol, may also be used. Polyesteramides may be obtained by the inclusion of aminoalcohols such as ethanolamine in polyesterification mixtures.

Polythioether polyols which may be used include products obtained by condensing thiodiglycol (either alone or with other glycols), with dicarboxylic acids, formaldehyde, alkylene oxides, aminocarboxylic acids, or combinations thereof.

Polycarbonate polyols which may be used include products obtained by reacting diols such as 1,3-propanediol, 1,4-butanediol, 1,6-hexanediol, diethylene glycol or tetraethylene glycol with diaryl carbonates, (for example diphenyl carbonate), with cyclic carbonates (i.e. ethylene carbonate), or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated homo- and copolymers and suitable polysiloxane polyols include polydimethylsiloxane diols and triols, wherein the hydroxyl groups are organically bound.

Polymeric polyamines having molecular weights in the range from 1500 to about 12000 are well known as components of polyurea forming reaction mixtures and may be prepared by methods fully described in the prior art. As examples of suitable polyamines, there may be mentioned amino-terminated polythioethers, polyesters, polyesteramides, polycarbonates, polyacetals, polyolefins, polysiloxane and, especially, polyethers obtained by replacing the hydroxy groups of the corresponding polyols partially or completely by secondary or preferably primary amino groups. The preferred polymeric polyamines are polyether diamines and triamines, especially polyoxypropylene diamines and triamines.

Imino-functional polymers having molecular weights in the range from 1,500 to about 12,000 have been described in U.S. Pat. No. 4,794,129, herein incorporated by reference, together with methods for their preparation.

The preferred imino-functional polymers are imine-terminated polyethers such as may be obtained for example by reacting an aldehyde or ketone with a polyether polyamine, especially a polyoxypropylene diamine or triamine.

Enamine functional polymers may be prepared either from secondary amine terminated resins (i.e. polyethers) by reaction with ketones/aldehydes having one or more alpha hydrogens, or by reacting ketone/aldehyde terminated resins (bearing alpha hydrogens) with secondary amines, providing for removal of the H$_2$O formed in the reactions. Secondary amine terminated resins can be obtained, for example by catalytic hydrogenation of the imino-functional polymers described hereinabove. Ketone/aldehyde terminated resins may be obtained, in general, by oxidation of the corresponding secondary or primary hydroxyl terminated resin. More highly reactive enamine functional polymers can be prepared by oxidizing a primary hydroxy functional resin to the corresponding polycarboxylic acid, conversion of the said groups to orthoesters, and treatment of the latter, with an excess of a secondary amine. Each orthoester must contain at least one alpha hydrogen atom.

Polymers containing a plurality of isocyanate-reactive groups for inclusion in the isocyanate-reactive compositions of the invention preferably have molecular weights in the range from 2000 to 8000 and have isocyanate-reactive functionalities of from 2 to 4, especially 2 or 3.

Chain extenders having molecular weights below 1500 which may be present in the isocyanate-reactive compositions of the invention have been fully described in the prior art and include polyols and polyamines, especially diols and diamines. Mixtures of different chain extenders may be used if desired. Preferred chain extenders have molecular weights below 800 and often below 500.

Polyols which may be used as chain extenders include ethylene glycol and 1,4-butanediol.

Polyamines which may be used as chain extenders include aliphatic polyamines, especially diamines, and aromatic polyamines, especially sterically hindered diamines. Ethylene diamine and low molecular weight polyether diamines are examples of suitable aliphatic polyamines whilst suitable aromatic diamines include 3,5-diethyl-2,4-toluene diamine, 3,5-diethyl-2,6-toluene diamine and mixtures thereof, (referred to as DETDA) 4,4'- and 2,4'-diaminodiphenylmethanes and mixtures thereof, 2,4- and 2,6-diaminotoluenes and mixtures thereof, 1,3,5-triisopropyl-2,4-diaminobenzene, 1,3,5-triethyl-2,4-diamino benzene 3,3',5,5'-tetraisopropyl-4,4'-diaminodi-phenylmethane and the like.

Other chain extenders which may be used include iminofunctional compounds as described in U.S. Pat. No. 4,794,129 and enamines.

The relative proportions of isocyanate-reactive polymer and chain extender present in the isocyanate-reactive compositions of the invention generally conform to the teachings of the prior art. The isocyanate index used can be 70–190, preferably 90–115, most preferably 95–108. If a catalyst for the trimerization of isocyanate groups is present, the index can extend up to 1500. The concentration of internal mould release composition in the isocyanate-reactive composition is typically such that the latter contains from about 0.1 to about 10% by weight of metal salt, preferably from about 1% to about 5%. If desired, however, a more concentrated solution or dispersion of internal mould release composition in one or more compounds containing a plurality of isocyanate-reactive groups may be prepared to act as a masterbatch to be mixed with further isocyanate-reactive compound before being used in the moulding process.

The moulding process comprises reacting a polyisocyanate composition with an isocyanate-reactive composition of the invention in a suitable mould.

Accordingly, in a still further aspect of the invention, there is provided a reaction system for use in making a moulded article, said system comprising the following components:

(1) a polyisocyanate composition, and
(2) an isocyanate-reactive composition, comprising at least one compound having a plurality of isocyanate-reactive groups having dissolved or dispersed therein an effective amount of an internal mould release composition comprising:
(a) a metal salt of an organic acid, said metal salt having mould release properties, and
(b) a compatibilising amount of an amidine or imidate compound of formula 1 or 2, the metal salt being incompatible with the compound having a plurality of isocyanate-reactive groups in the absence of the compatibiliser, under the conditions used for preparing and/or processing said isocyanate reactive composition.

The invention also provides a reaction system for use in making a reaction injection moulded article, said system comprising the following components:
(1) a polyisocyanate composition, and
(2) an isocyanate-reactive composition comprising:
 (i) at least one polymer containing a plurality of isocyanate-reactive groups and having a number average molecular weight of from 1500 to about 12000;
 (ii) at least one chain extender having a molecular weight less than 1500, and
 (iii) an effective amount of an internal mould release composition comprising:
  (a) a metal salt of an organic acid, said metal salt having mould release properties, and
  (b) a compatibilising amount of an amidine or imidate compound of formula 1 or 2, the metal salt being incompatible with the combination of (i) and (ii) in the absence of the compatibiliser, under the conditions used for preparing and/or processing said isocyanate reactive composition.

Polyisocyanate compositions which may be reacted with the isocyanate-reactive compositions of the invention in the moulding process may include any of the aliphatic, cycloaliphatic, araliphatic or aromatic polyisocyanates known in polyurethane or polurea chemistry, especially those that are liquid at room temperature.

Examples of suitable polyisocyanates include 1,6-hexamethylene diisocyanate, isophorone diisocyanate, cyclohexane-1,4-diisocyanate, 4,4'-dicyclo-hexylmethane diisocyanate, 1,4-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenylene polyisocyanates (crude MDI) and 1,5-naphthylene diisocyanate. Mixtures of polyisocyanates can be used and also polyisocyanates which have been modified by the introduction of urethane, allophanate, urea, biuret, carbodiimide, uretonimine or isocyanurate residues.

In general, the aromatic polyisocyanates are preferred, especially the available MDI isomers, that is to say 4,4'-diphenylmethane diisocyanate, 2,4'-diphenylmethane diisocyanate and mixtures thereof. MDI variants such as uretonimine-modified MDI and MDI prepolymers are also of great value in the moulding process.

The reaction systems of the invention may also contain other conventional ingredients of such systems, said ingredients usually being present in the isocyanate-reactive compositions of the invention. Such ingredients include catalysts, for example tin compounds and tertiary amines; surface-active agents and foam stabilisers, for example siloxane-oxyalkylene copolymers, blowing agents, for example water and low boiling halogenated hydrocarbons, flame retardants, plasticisers, dyes, fillers and reinforcing agents.

In the moulding process, the techniques and equipment used may be those that have been fully described in the prior art. RIM processes which may be used include structural (including mat-reinforced) RIM, amine extended RIM processes and "spray" RIM processes, and "spray" RIM processes The invention is illustrated but not limited by the following Examples:

EXAMPLE 1 a) A hazy solid internal mold release composition B containing 50% by weight of mold release agent was prepared by mixing at 80° C. and then cooling, a mixture of 20 g of an imidazoline containing compound commercialised by Lakeland Laboratories Ltd. under the trade mark IMIDAZOLINE 18 OH and having the structure

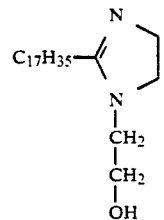

20 g of Zinc Stearate b) A slightly hazy but stable isocyanate reactive composition suitable for RIM processes was obtained by mixing at 80° C. and then cooling to room temperature
4 g of the above described internal mould release composition
80 g of a high molecular weight ethylene oxide tipped triol, having a hydroxyl value of 28 mg KOH/g, commercialized by ICI under the trade mark DALTOCEL F2805
20 g of DETDA

EXAMPLE 2 a) A hazy solid internal mould release composition C containing 33% by weight of mould release agent was prepared by mixing at 80° C. and then cooling, a mixture of
20 g of an imidazoline containing compound commercialised by Lakeland Laboratories Ltd. under the trademark IMIDAZOLINE 18DA and having the structure

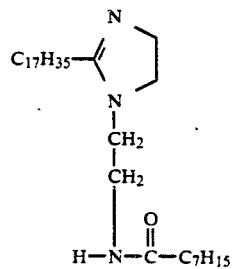

10 g of Zinc Stearate.

b) A slightly hazy but stable isocyanate reactive composition suitable for RIM-processes was obtained by mixing at 80° C. and then cooling to 45° C.

6 g of the above described internal mould release composition
80 g of DALTOCEL F2805
20 g of DETDA

EXAMPLE 3

A clear isocyante reactive composition containing a mould release agent suitable for RIM-processes was obtained by mixing at 110° C. and cooling to room temperature, a mixture of
1 g of Zinc Stearate and
80 g DALTOCEL F2805
20 g DETDA
3 g methyloxazoline When 2 g of Zinc Stearate was used in the same formulation a slightly hazy but stable isocyanate reactive composition suitable for RIM-processes was obtained.

We claim:

1. An isocyanate-reactive composition comprising at least one compound having a plurality of isocyanate-reactive groups having dissolved or dispersed therein an effective amount of an internal mould release composition comprising:
   (a) a metal salt of an organic acid, said metal salt having mould release properties, and
   (b) a compatibilising amount of an amidine or imidate compound or mixture thereof of formula (1)

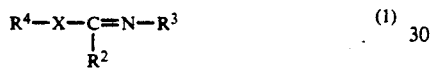

(1)

wherein X represents O, S or $NR^1$ and wherein each of $R^1$ to $R^4$, independently or together represents H or an organic radical, selected from:
   (a) alkyl radicals
   (b) cyclo alkyl radicals
   (c) aralkyl radicals and aryl radicals and
   (d) polymeric chains containing hetero atoms
   and wherein the metal salt in the mould release composition is incompatible with the compound having a plurality of isocyanate-reactive groups in the absence of the amidine or imidate compound(s) of formula (1), under the conditions of preparation and processing employed for said isocyanate reactive composition.

2. An isocyanate-reactive composition according to claim 1 containing:
   (i) at least one polymer containing a plurality of isocyanate-reactive groups and having a number average molecular weight of from 1500 to about 12000, and
   (ii) at least one chain extender having a molecular weight less than 1500, the metal salt in the mould release composition being incompatible with the combination of (i) and (ii) in the absence of the compatibiliser, under the conditions of preparation and processing used for said composition, in the absence of the amidine or imidate compound(s) of formula 1.

3. An isocyanate-reactive composition according to claim 2 wherein the chain-extender comprises an aromatic diamine.

4. A reaction system for use in making a moulded article, said system comprising:
   (1) a polyisocyanate composition, and
   (2) an isocyanate-reactive composition of claim 1, 2 or 3.

5. A reaction system according to claim 4 wherein the polyisocyanate composition comprises at least one diphenylmethane diisocyanate isomer, diphenylmethane diisocyanate prepolymer or uretonimine-modified diphenylmethane diisocyanate.

6. A moulded article obtained from a reaction system of claim 4.

* * * * *